(12) United States Patent
Hwang et al.

(10) Patent No.: US 9,036,110 B2
(45) Date of Patent: May 19, 2015

(54) DISPLAY APPARATUS AND METHOD OF MANUFACTURING THE SAME

(71) Applicant: SAMSUNG DISPLAY CO, LTD., Yongin, Gyeonggi-do (KR)

(72) Inventors: Insun Hwang, Suwon-si (KR); Sungyong Kang, Asan-si (KR); Changmoo Lee, Yongin-si (KR); Kwang-Wook Choi, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 130 days.

(21) Appl. No.: 13/844,718

(22) Filed: Mar. 15, 2013

(65) Prior Publication Data

US 2014/0168534 A1    Jun. 19, 2014

(30) Foreign Application Priority Data

Dec. 18, 2012  (KR) .......................... 10-2012-0148742

(51) Int. Cl.
*G02F 1/1333* (2006.01)
*G02F 1/1335* (2006.01)
*G02F 1/13* (2006.01)

(52) U.S. Cl.
CPC ........ *G02F 1/133608* (2013.01); *G02F 1/1309* (2013.01); *G02F 1/133308* (2013.01); *G02F 2001/133317* (2013.01)

(58) Field of Classification Search
USPC .......................................................... 349/58
See application file for complete search history.

(56) References Cited

U.S. PATENT DOCUMENTS

| | | | | |
|---|---|---|---|---|
| 5,870,160 | A * | 2/1999 | Yanagawa et al. | 349/141 |
| 6,380,998 | B1 | 4/2002 | Arai | |
| 6,411,353 | B1 * | 6/2002 | Yarita et al. | 349/59 |
| 6,515,721 | B2 * | 2/2003 | Jin et al. | 349/58 |
| 6,552,761 | B1 | 4/2003 | Seo et al. | |
| 6,771,327 | B2 * | 8/2004 | Sekiguchi | 349/12 |
| 6,812,974 | B1 * | 11/2004 | Hinata et al. | 349/12 |
| 7,113,235 | B2 * | 9/2006 | Tsukamoto | 349/58 |
| 7,602,451 | B2 * | 10/2009 | Hinata | 349/12 |
| 2008/0266273 | A1 | 10/2008 | Slobodin et al. | |
| 2010/0277663 | A1 | 11/2010 | Koo | |
| 2011/0007236 | A1 | 1/2011 | Kim et al. | |
| 2011/0267307 | A1 | 11/2011 | Kim et al. | |

FOREIGN PATENT DOCUMENTS

| | | |
|---|---|---|
| JP | 2011-191601 A | 9/2011 |
| KR | 10-2002-0056718 A | 7/2002 |
| KR | 10-2004-0026761 A | 4/2004 |
| KR | 10-2007-0088915 A | 8/2007 |
| KR | 10-2008-0018307 A | 2/2008 |
| KR | 10-2010-0119982 A | 11/2010 |

(Continued)

*Primary Examiner* — James Dudek
(74) *Attorney, Agent, or Firm* — Innovation Counsel LLP

(57) ABSTRACT

A display apparatus includes a display panel including a protective electrode and a ground pad that is applied with a ground voltage, a conductive member electrically connecting the ground pad and the protective electrode, a backlight unit providing light to the display panel, a bottom chassis accommodating the backlight unit, and at least one fixing member fixing a side portion of the display panel and a side portion of the bottom chassis to each other. The fixing member makes contact with the conductive member and the bottom chassis to electrically connect the conductive member and the bottom chassis.

16 Claims, 6 Drawing Sheets

(56) References Cited

FOREIGN PATENT DOCUMENTS

| KR | 10-2012-0005872 A | 1/2012 |
|---|---|---|
| KR | 10-2012-0027997 A | 3/2012 |

\* cited by examiner

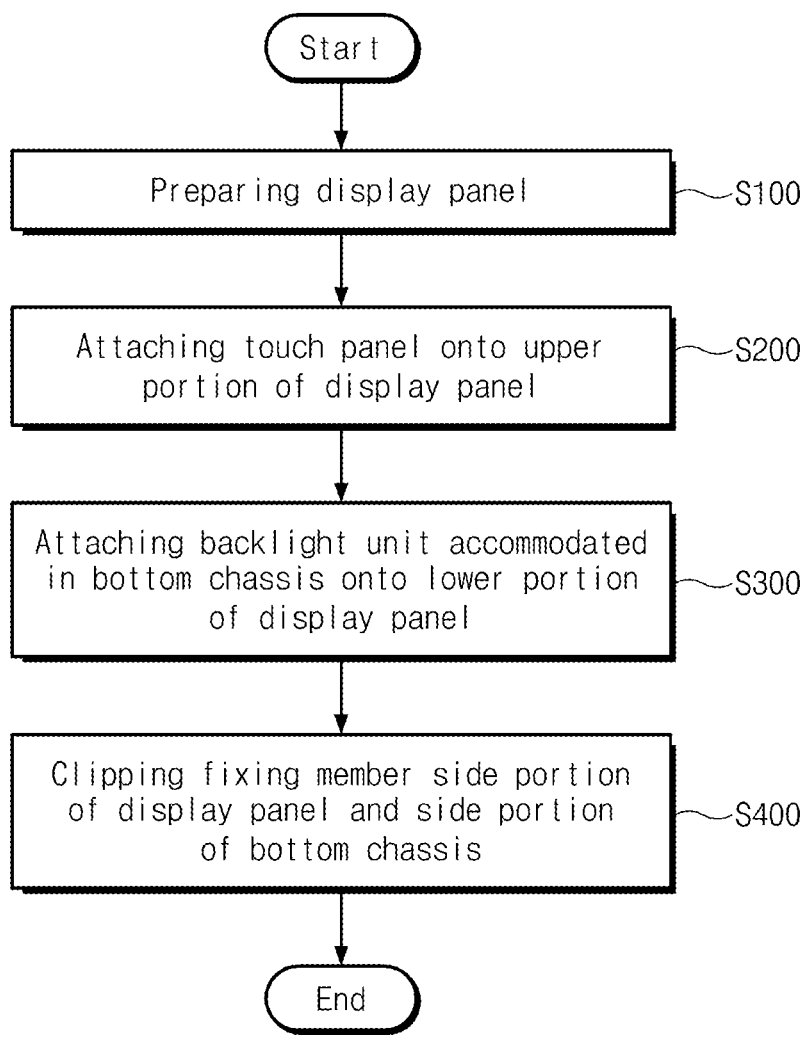

DISPLAY APPARATUS AND METHOD OF MANUFACTURING THE SAME

CROSS-REFERENCE TO RELATED APPLICATION

This U.S. non-provisional patent application claims priority under 35 U.S.C. §119 of Korean Patent Application No. 10-2012-0148742, filed on Dec. 18, 2012, the contents of which are hereby incorporated by reference.

BACKGROUND

1. Field of Disclosure

The present disclosure relates to a display apparatus and a method of manufacturing the same.

More particularly, the present disclosure relates to a display apparatus capable of being easily reworked and a method of manufacturing the display apparatus.

2. Description of the Related Art

In recent years, display apparatuses that employ a touch input device have been spotlighted. Such display apparatuses, which have a touch function, include a display panel displaying an image, a backlight unit providing light to the display panel, and a touch panel as a user input device. The touch panel is disposed on the display panel, and the backlight unit is disposed under the display panel.

A liquid crystal display panel operated in an in-plane switching (IPS) mode is often used as the display panel. In general, a protective electrode is disposed on the liquid crystal display panel operated in the IPS mode. The protective electrode prevents liquid crystal molecules from being disturbed by an external electric field (or a static electricity). The protective electrode is applied with a ground voltage.

When the display apparatus is manufactured, the backlight unit is accommodated in a bottom chassis. The bottom chassis holds a printed circuit board that is used to apply a driving signal to the display panel, and which is applied with the ground voltage. The display panel and the bottom chassis are wrapped by a conductive tape. The protective electrode is electrically connected to the bottom chassis by the conductive tape. The touch panel is attached onto the display panel after the display panel and the backlight unit are fitted into the bottom chassis.

SUMMARY

The present disclosure provides a display apparatus capable of being easily reworked.

The present disclosure provides a method of manufacturing the display apparatus.

A display apparatus is provided including a display panel that includes a protective electrode and a ground pad that is applied with a ground voltage, a conductive member that electrically connects the ground pad and the protective electrode, a backlight unit that provides light to the display panel, a bottom chassis that accommodates the backlight unit, and at least one fixing member that fixes a side portion of the display panel and a side portion of the bottom chassis to each other. The fixing member makes contact with the conductive member and the bottom chassis to electrically connect the conductive member and the bottom chassis.

The display apparatus may further include a touch panel disposed on the display panel and a first adhesive member that attaches the touch panel to the display panel.

The display panel may further include a first substrate that includes a plurality of pixels, a second substrate that faces the second substrate, a liquid crystal layer interposed between the first substrate and the second substrate, a gate driver that applies gate signals to the pixels, and a data driver that applies data voltages to the pixels, and the protective electrode is disposed on an upper surface of the second substrate.

The first substrate may include a first area and a second area, which are not overlapped with the second substrate and extended in directions perpendicular to each other along a border area of the first substrate. The gate driver is disposed in the first area, and the data driver is connected to the second area.

The ground pad may include a first ground pad disposed in the first area and a second ground pad disposed in the second area.

The conductive member may include a first conductive member that covers the first area and a predetermined area of an upper surface of the protective electrode adjacent to the first area to electrically connect the first ground pad and the protective electrode and a second conductive member that covers the second area and a predetermined area of the upper surface of the protective electrode adjacent to the second area to electrically connect the second ground pad and the protective electrode.

The fixing member may make contact with an upper surface of the first conductive member that is contact with the protective electrode and a predetermined area of outer side and lower surfaces of the side portion of the bottom chassis, and the first conductive member and the second conductive member are overlapped with each other in an area in which the first conductive member crosses the second conductive member.

The display apparatus may further include a plurality of second adhesive members disposed on areas of side portions of a lower surface of the display panel excluding the side portion of the lower surface of the display panel corresponding to a position where the fixing member is disposed, and the backlight unit is attached to the display panel by the second adhesive members.

A method of manufacturing a display apparatus is provided including preparing a display panel that includes a protective electrode, ground pads applied with a ground voltage, and a plurality of conductive members electrically connecting the ground pads and the protective electrode, disposing a touch panel on the display panel, attaching the touch panel to the display panel, disposing a bottom chassis, in which a backlight unit is accommodated, under the display panel, disposing a plurality of adhesive members on areas of side portions of a lower surface of the display panel excluding the side portion of the lower surface of the display panel corresponding to a position where the fixing member is disposed, attaching the display panel and the backlight unit to each other using the adhesive members, and fixing the side portion of the display panel and a side portion of the bottom chassis to each other using at least one fixing member. The fixing member makes contact with the conductive members and the bottom chassis to electrically connect the conductive members and the bottom chassis.

According to the above, the display apparatus may be easily reworked.

BRIEF DESCRIPTION OF THE DRAWINGS

The above and other advantages of the present disclosure will become readily apparent by reference to the following detailed description when considered in conjunction with the accompanying drawings wherein:

FIG. 5 is a flowchart showing a method of manufacturing a display apparatus according to an exemplary embodiment of the present disclosure.

DETAILED DESCRIPTION

Hereinafter, the example embodiments will be explained in detail with reference to the accompanying drawings.

Figure 1:
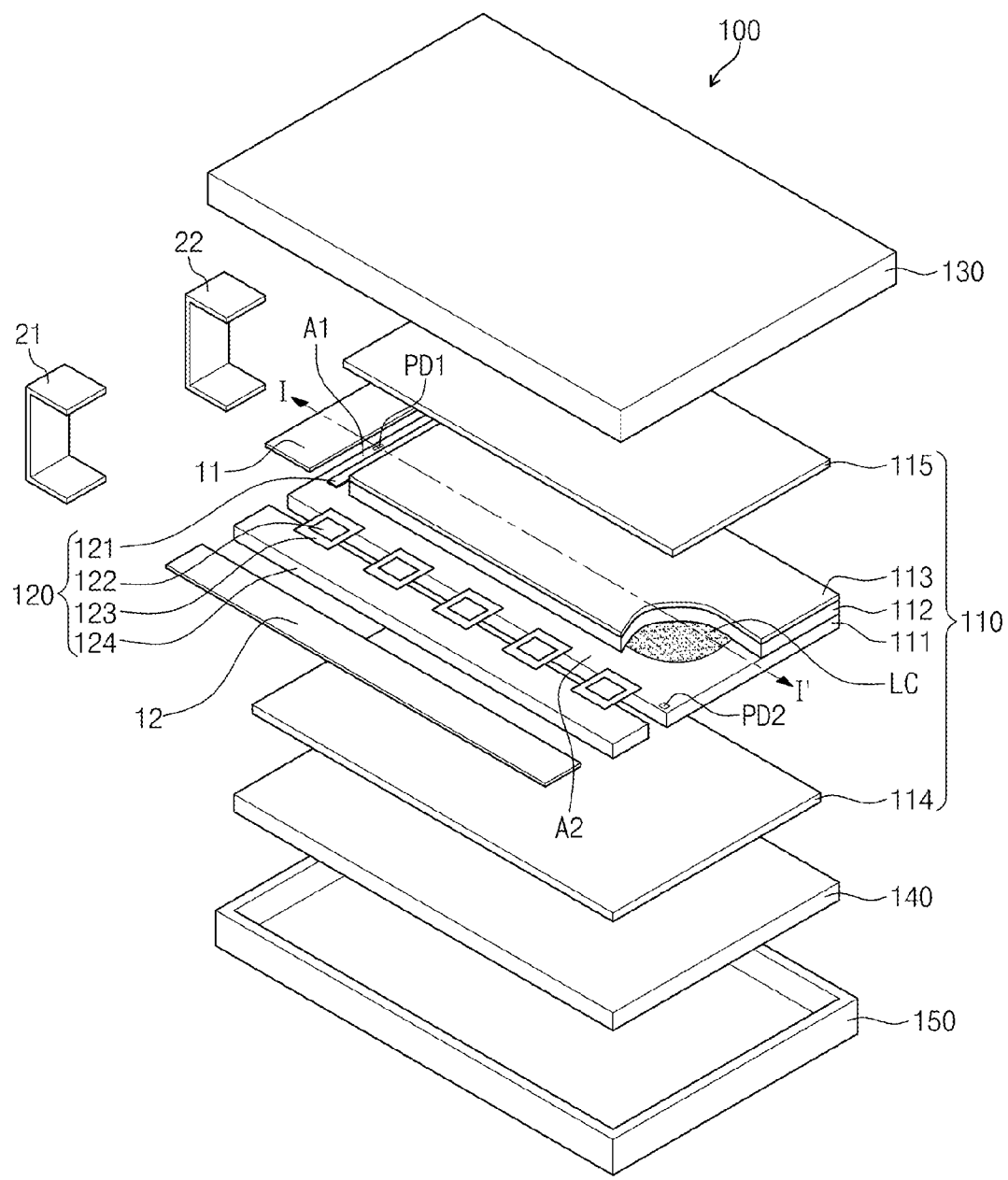
FIG. 1 is an exploded perspective view showing a display apparatus according to an exemplary embodiment of the present disclosure.

FIG. 1 is an exploded perspective view showing a display apparatus according to an exemplary embodiment of the present disclosure.

Referring to FIG. 1, a display apparatus 100 includes a display panel 110, a driving unit 120, a touch panel 130, a backlight unit 140, a bottom chassis 150, a plurality of conductive members 11 and 12, a plurality of fixing members 21 and 22, and a plurality of ground pads PD1 and PD2.

The display panel 110 includes a first substrate 111, a second substrate 112 facing the first substrate 111, a liquid crystal layer LC interposed between the first substrate 111 and the second substrate 112, a protective electrode 113 disposed on the second substrate 112, a lower polarizing plate 114 disposed under the first substrate 111, and an upper polarizing plate 115 disposed on the second substrate 112.

The display panel 110 may be, but is not limited to, a liquid crystal display panel operated in an in-plane switching (IPS) mode. The liquid crystal layer LC includes liquid crystal molecules operated in the IPS mode.

A plurality of pixels (not shown) is disposed on the first substrate 111 and arranged in a matrix form. Each pixel includes a thin film transistor (not shown) connected to a gate line (not shown) and a data line (not shown), a pixel electrode (not shown) connected to the thin film transistor, and a common electrode (not shown).

The second substrate 112 includes a plurality of color filters (not shown) arranged in a matrix form. Each color filter has one of red, green, and blue colors. The color filters assign predetermined colors to light passing through the display panel 110.

Each thin film transistor receives a data voltage provided through the data line in response to a gate signal provided through the gate line. The data voltage is applied to the pixel electrode through the thin film transistor. When the data voltage is applied to the pixel electrode and a common voltage is applied to the common electrode, the in-plane switching electric field is formed and the arrangement of the liquid crystal molecules of the liquid crystal layer LC is changed. The transmittance of the light provided from the backlight unit 140 and passing through the liquid crystal layer LC is changed by the changed arrangement of the liquid crystal molecules of the liquid crystal layer LC, and thus a desired image is displayed.

The driving part 120 includes a gate driver 121, a plurality of source driver chips 122, a plurality of flexible printed circuit boards 123 respectively corresponding to the source driver chips 122, and a driving circuit board 124. The source driver chips 122 form a data driver.

The first substrate 111 includes a first area A1 and a second area A2, which are not overlapped with the second substrate 112. The first area A1 and the second area A2 extend in directions perpendicular to each other and extend along a border area of the first substrate 111. For instance, the first area A1 is extended in a column direction at a left side portion of the first substrate 111 and the second area A2 is extended in a row direction at a lower side portion of the first substrate 111.

The gate driver 121 is mounted in the first area A1 of the first substrate 111 in an amorphous silicon TFT gate driver circuit. The gate driver 121 generates gate signals in response to a gate control signal provided from a timing controller (not shown) that is mounted on the driving circuit board 124. The gate signals are sequentially applied to the pixels in the unit of row.

Each source driver chip 122 is mounted on a corresponding flexible printed circuit board of the flexible printed circuit boards 123 and connected to the driving circuit board 124 and the second area A2. In the present exemplary embodiment, the source driver chips 122 are mounted on the flexible printed circuit boards 123, e.g., a tape carrier package structure, but they are not limited thereto or thereby. That is, the source driver chips 122 may be mounted, for example, on the second area A2 of the first substrate 111 in a chip-on-glass (COG) structure. Although not shown in figures, a plurality of data pads may be arranged in the second area A2. The data lines may be connected to the source driver chips 122 through the data pads.

The source driver chips 122 receive image signals and a data control signal from the timing controller mounted on the driving circuit substrate 124. The source driver chips 122 generate analog data voltages corresponding to the image signals in response to the data control signal. The data voltages are applied to the pixels.

The ground pads PD1 and PD2 include a first ground pad PD1 disposed in the first area A1 and a second ground pad PD2 disposed in the second area A2. The first and second ground pads PD1 and PD2 are applied with a ground voltage.

The conductive members 11 and 12 may be, but are not limited to, a conductive tape. The conductive members 11 and 12 include a first conductive member 11 and a second conductive member 12.

The first conductive member 11 covers the first area A1 of the first substrate 111 so as to be electrically connected to the first ground pad PD1. In addition, the first conductive member 11 covers a predetermined area of an upper surface of the protective electrode 113 adjacent to the first area A1 so as to make contact with a predetermined area of the protective electrode 113. The first conductive member 11 is electrically connected to the protective electrode 113. Accordingly, the protective electrode 113 and the first ground pad PD1 are electrically connected to each other by the first conductive member 11.

The second conductive member 12 covers the second area A2 of the first substrate 111 so as to be electrically connected to the second ground pad PD2. In addition, the second conductive member 12 covers a predetermined area of the upper surface of the protective electrode 113 adjacent to the second area A2 so as to make contact with a predetermined area of the protective electrode 113. The second conductive member 12 is electrically connected to the protective electrode 113. Accordingly, the protective electrode 113 and the second ground pad PD2 are electrically connected to each other by the second conductive member 12.

As described above, the first and second ground pads PD1 and PD2 are electrically connected to the protective electrode 113 by the first and second conductive members 11 and 12. Thus, the protective electrode 113 disposed on the upper surface of the second substrate 112 is applied with the ground voltage.

The structure in which the first and second conductive members 11 and 12 make contact with the first and second areas A1 and A2 and the protective electrode 113 will be described in more detail with reference to FIG. 2.

The protective electrode 113 is applied with the ground voltage. The protective electrode 113 prevents the liquid crystal molecules of the liquid crystal layer LC from being disturbed by an external electric field (or a static electricity).

The touch panel 130 is disposed on the display panel 110. The touch panel 130 generates an electrical signal indicating a position at which an input device, e.g., a finger of user, a touch pen, etc., makes contact with a screen thereof.

The touch panel 130 may be one of various types of touch panels, and may be, for example, a resistive overlay type touch panel, a capacitive overlay type touch panel, a surface acoustic wave type touch panel, an infrared type touch panel, etc. In the present exemplary embodiment, the capacitive overlay type touch panel will be described as the touch panel 130. The capacitive overlay type touch panel 130 includes a plurality of sensing electrodes (not shown). In this case, the touch panel 130 senses a variation of capacitance (or a variation of electric field) between the sensing electrodes when the finger of user or the touch pen makes contact with the screen of the touch panel 130, and converts the sensed result to the electrical signal indicating the touch position.

The backlight unit 140 is disposed under the display panel 110 to provide light to the display panel 110. The backlight unit 140 may be, for example, a direct-illumination type backlight unit that provides the light through a lower portion of the display panel 110 or an edge-illumination type backlight unit that provided the light through a side portion of the display panel 110.

The backlight unit 140 is accommodated in the bottom chassis 150. The bottom chassis 150 is applied with the ground voltage. The bottom chassis 150 protects the display panel 110 and the backlight unit 140.

The fixing members 21 and 22 include a first fixing member 21 and a second fixing member 22. Each of the first and second fixing members 21 and 22 has a general U-shape that is somewhat flattened and elongated along the bottom portion of the 'U', e.g., a clip shape. The first and second fixing members 21 and 22 are clipped with a side portion of the display panel 110 where the gate driver 121 is disposed, and a side portion of the bottom chassis 150 corresponding to the position of the side portion of the display panel 110 where the gate driver 121 is disposed. The first and second fixing members 21 and 22 make contact with the first conductive member 11 connected to the protective electrode 113 and the bottom chassis 150, and thus the first conductive member 11 and the bottom chassis 150 are electrically connected to each other by the first and second fixing members 21 and 22.

The structure in which the first and second fixing members 21 and 22 are clipped with a side portion of the display panel 110 and a side portion of the bottom chassis 150 will be described in more detail with reference to FIG. 2.

Figure 2:
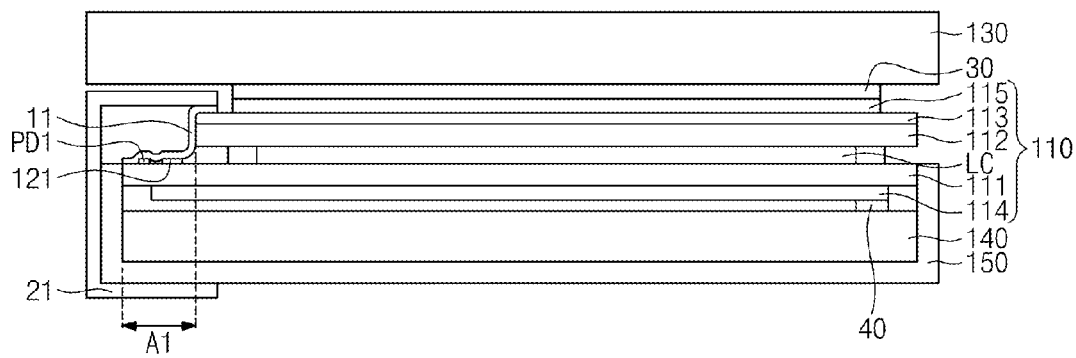
FIG. 2 is a cross-sectional view taken along a line I-I' shown in FIG. 1.
Figure 3:
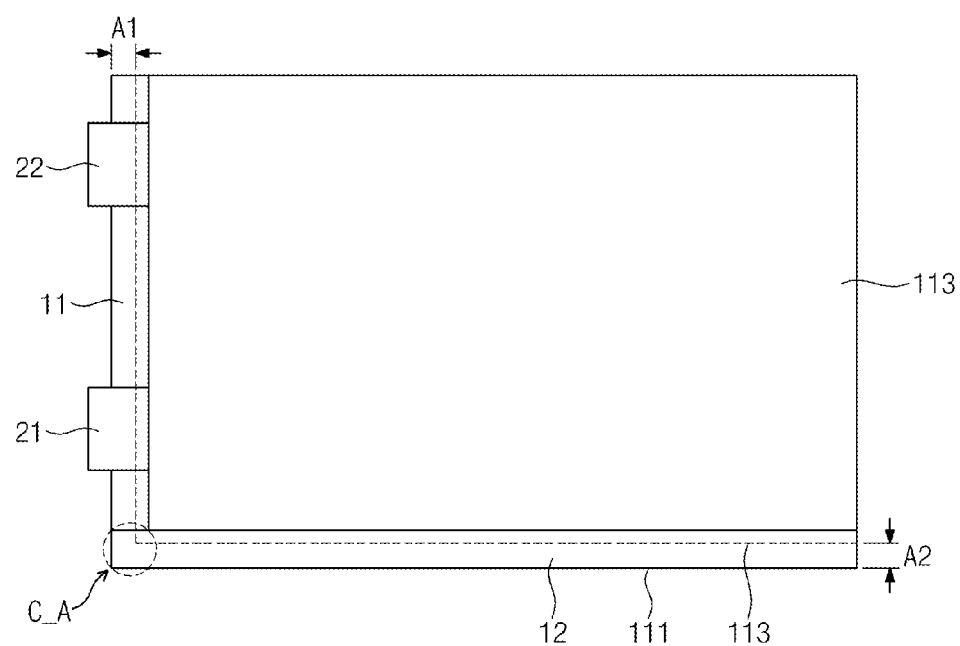
FIG. 3 is a top plan view showing the display apparatus shown in FIG. 1.
Figure 4:
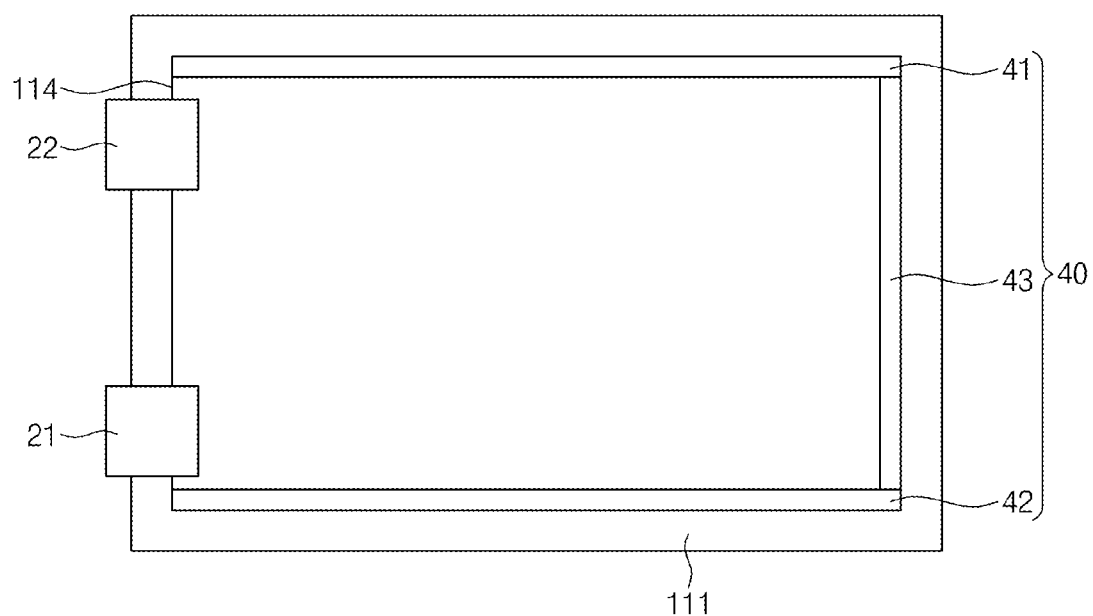
FIG. 4 is a bottom plan view showing the display apparatus shown in FIG. 1.

FIG. 2 is a cross-sectional view taken along a line I-I' shown in FIG. 1, FIG. 3 is a top plan view showing the display apparatus shown in FIG. 1, and FIG. 4 is a bottom plan view showing the display apparatus shown in FIG. 1.

Referring to FIGS. 2, 3, and 4, the first conductive member 11 covers the first area A1 of the first substrate 111 as shown in FIG. 3, and thus the first conductive member 11 covers the gate driver 121 and the first ground pad PD1, which are disposed in the first area A1. The first conductive member 11 makes contact with the first ground pad PD1 so as to be electrically connected to the first ground pad PD1. The first conductive member 11 makes contact with the portion of the upper surface of the protective electrode 113 adjacent to the first area A1 so as to be electrically connected to the protective electrode 113. Accordingly, the first ground pad PD1 and the protective electrode 113 are electrically connected to each other by the first conductive member 11.

Because the ground voltage is applied to the first ground pad PD1, the ground voltage is applied to the protective electrode 113 by the first conductive member 11, which is connected to both the ground pad PD1 and the protective electrode 113. The first conductive member 11 is applied with the ground voltage by the first ground pad PD1, and the first conductive member 11 covers the gate driver 121. Thus, the first conductive member 11 protects the gate driver 121 from an external static electricity.

Although not shown in figures, the second conductive member 12 has the substantially same structure as the first conductive member 11. For instance, the second conductive member 12 covers the second area A2 of the first substrate 111 as shown in FIG. 3, and thus the second conductive member 12 covers the second ground pad PD2 and the data pads, which are disposed in the second area A2. The second conductive member 12 makes contact with the second ground pad PD2 so as to be electrically connected to the second ground pad PD2. The second conductive member 12 makes contact with the portion of the upper surface of the protective electrode 113 adjacent to the second area A2 so as to be electrically connected to the protective electrode 113. Accordingly, the second ground pad PD2 and the protective electrode 113 are electrically connected to each other by the second conductive member 12.

Because the ground voltage is applied to the second ground pad PD2, the ground voltage is applied to the protective electrode 113 by the second conductive member 12, which is connected to both the protective electrode 113 and the second ground pad PD2. The second conductive member 12 is applied with the ground voltage by the second ground pad PD2 and covers the data pads. Thus, the second conductive member 12 protects the data pads from an external static electricity.

As shown in FIG. 3, the first conductive member 11 and the second conductive member 12 are overlapped with, and make contact with, each other in an area C_A in which the first conductive member 11 crosses the second conductive member 12.

In the present exemplary embodiment, the conductive tape has been described as the first and second conductive members 11 and 12, but the first and second conductive members 11 and 12 are not limited to the conductive tape. The first and second conductive members 11 and 12 can be made of a flexible and conductive material and may be, for example, a silver paste. Such a silver paste includes a conductive material and a silver component. When the silver paste is used, the silver paste is coated on the first area A1, the portion of the protective electrode 113 adjacent to the first area A1, the second area A2, and the portion of the protective electrode 113 adjacent to the second area A2. The coated silver paste is cured.

Referring to FIG. 2, touch panel 130 is disposed on the display panel 110. The display panel 110 and the touch panel 130 are attached to each other by a first adhesive member 30. The first adhesive member 30 may be, but not limited to, an optical clear adhesive (OCA).

The protective electrode 113 is disposed on the upper surface of the second substrate 112 of the display panel 110. The upper polarizing plate 115 is disposed on the upper surface of the protective electrode 113. The first adhesive member 30 is disposed on the upper polarizing plate 115, and the touch panel 130 is attached to the display panel 110 by the first adhesive member 30.

The backlight unit 140 is disposed under the display panel 110. The display panel 110 and the backlight unit 140 are attached to each other by a second adhesive member 40. The second adhesive member 40 may be, but is not limited to, a double-sided tape.

The lower polarizing plate 114 is disposed on the lower surface of the first substrate 111 of the display panel 110. The second adhesive member 40 is disposed on a lower surface of the lower polarizing plate 114, and the backlight unit 140 is attached to the display panel 110 by the second adhesive member 40.

The second adhesive member 40 is disposed on an area of the lower surface of the display panel 110 that is facing the backlight unit 140, and may be disposed on a side portion of the display panel 110 where the first and second fixing members 21 and 22 are not disposed.

For instance, referring to FIG. 4, the side portion of the display panel 110 where the first and second fixing members 21 and 22 are disposed may be a left area on the lower surface of the display panel 110. The second adhesive member 40 includes a plurality of double-sided tapes 41, 42, and 43. The double-sided tapes 41, 42, and 43 may be referred to as plural second adhesive members. The double-sided tapes 41, 42, and 43 include a first double-sided tape 41, a second double-sided tape 42, and a third double-sided tape 43. The first, second, and third double-sided tapes 41, 42, and 43 are respectively disposed on an upper area, a lower area, and a right area (i.e., an upper side portion, right side portion, and lower side portion) on the lower surface of the display panel 110. The upper, lower, and right areas of the lower surface of the display panel 110 make contact with the backlight unit 140 by the first, second, and third double-sided tapes 41, 42, and 43, respectively.

In the present exemplary embodiment, the second adhesive member 40 includes the first, second, and third double-sided tapes 41, 42, and 43, but it is not limited thereto or thereby. That is, the second adhesive member 40 may include, for example, two double-sided tapes. The two double-sided tapes are located at two areas of the upper, lower, and right areas of the lower surface of the display panel 110.

The first and second fixing members 21 and 22 are clipped with the side portion of the display panel 110 where the gate driver 121 is located, and the side portion of the bottom chassis 150 corresponding to the position the side portion of the display panel 110 where the gate driver 121 is located. As shown in FIG. 4, the side portion of the display panel 110 where the gate driver 121 is located may be the left area of the display panel 110.

As described above, the second adhesive member 40 is not disposed on the side portion of the display panel 110 where the gate driver 121 is located. As a result, a fixing force becomes weak in the side portion of the display panel 110, and the side portion of the backlight unit 140, which corresponds to the side portion of the display panel 110. As shown in FIG. 4, the first and second fixing members 21 and 22 are clipped with the side portion of the display panel 110 where the gate driver 121 is located, and the side portion of the bottom chassis 150 corresponding to the position of the side portion of the display panel 110 where the gate driver 121 is located. Thus, the fixing force becomes strong in the side portion of the display panel 110 and the side portion of the backlight unit 140, which corresponds to the side portion of the display panel 110, even though the second adhesive member 40 is not disposed there.

The first and second fixing members 21 and 22 make contact with the first conductive member 11 and the bottom chassis 150. In detail, the first and second fixing members 21 and 22 make contact with the upper surface of the first conductive member 11, which is in contact with the protective electrode 113. In addition, each of the first and second fixing members 21 and 22 makes contact with a predetermined area of outer side and lower surfaces of a side portion of the bottom chassis 150. Accordingly, the first conductive member 11 and the bottom chassis 150 may be electrically connected to each other by the first and second fixing members 21 and 22.

Because the first and second fixing members 21 and 22 make contact with the upper surface of the first conductive member 11, which is in contact with the protective electrode 113, the display panel 110 may be prevented from being damaged due to the first and second fixing members 21 and 22.

In the present exemplary embodiment, two fixing members, e.g., the first and second fixing members 21 and 22, are used, but the number of the fixing members is not limited to two. In addition, the first and second fixing members 21 and 22 are disposed at the left area of the display panel 110, however the first and second fixing members 21 and 22 may be disposed at the lower side portion of the display panel 110, at which the second conductive member 12 is located. In this case, the second adhesive member 40 is not disposed at the lower side portion of the lower surface of the display panel 110.

In conventional display apparatuses, the backlight unit may be attached to the display panel by disposing the double-sided tapes on all four sides—the upper, lower, left, and right areas—of the lower surface of the display panel. In this case, when the display apparatus is manufactured, the backlight unit fitted in the bottom chassis is attached to the lower surface of the display panel, and the display panel and the bottom chassis are wrapped by the conductive tapes. Then, a touch panel is attached to the upper surface of the display panel by the adhesive member. In this case, when defects occur in the display apparatus, the conductive tapes are separated, and the display panel and the backlight unit are separated from each other, in order to rework the display apparatus. The separated conductive tape cannot be recycled. In addition, when the display panel and the backlight unit are separated from each other, the display panel may be damaged by adhesive force of the double-sided tapes disposed on the upper, lower, left, and right areas of the lower surface of the display panel 110.

According to the present exemplary embodiment, the side portion of the display panel 110 of the display apparatus 100 and the side portion of the backlight unit 140 are fixed to each other by the first and second fixing members 21 and 22. The first, second, and third double-sided tapes 41, 42, and 43 are disposed in the other side portions of the display panel 110, in which the first and second fixing members 21 and 22 are not disposed. The display panel 110 and the backlight unit 140 may be attached to each other by the first, second, and third double-sided tapes 41, 42, and 43. Thus, the fixing force of the display panel 110 and the backlight unit 140 is at least as strong as when the double-sided tapes are disposed in the upper, lower, left, and right areas of the lower surface of the display panel 110.

In addition, when the defects occur in the display apparatus 100, the first and second fixing members 21 and 22 are removed in order to rework the display apparatus 100. The double-sided tape is not disposed in the side portion of the display panel 110, in which the first and second fixing members 21 and 22 are disposed. Therefore, when the first and second fixing members 21 and 22 are removed, a predetermined space is generated between the side portion of the display panel 110 and the side portion of the backlight unit 140, because the first and second fixing members 21 and 22 are used instead of the double-sided tapes. When the display panel 110 and the backlight unit 140 are separated from each other using the predetermined space, the display panel 110 may be prevented from being damaged as compared to that when the double-sided tapes are disposed in the upper, lower, left, and right areas of the lower surface of the display panel 110. In addition, because the first and second conductive members 11 and 12 are not required to be removed, no additional conductive members are required even though the display apparatus 100 is reworked.

Consequently, the display apparatus 100 according to the present exemplary embodiment may be easily reworked.

FIG. 5 is a flowchart showing a method of manufacturing a display apparatus according to an exemplary embodiment of the present disclosure, and FIGS. 6A to 6D are cross-sectional views showing a method of manufacturing the display apparatus.

Figure 6A:
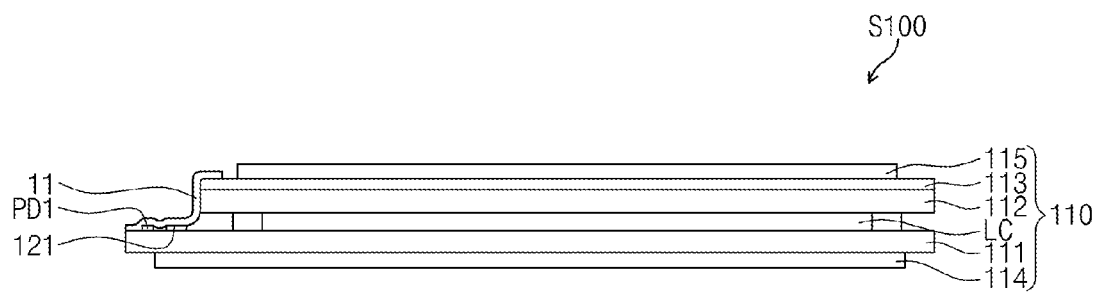
FIGS. 6A to 6D are cross-sectional views showing a method of manufacturing the display apparatus.

Referring to FIGS. 5 and 6A, the display panel 110 is prepared (S100). As described above, the first area A1 of the first substrate 111 of the display panel 100 and the predetermined area of the upper surface of the protective electrode 113 adjacent to the first area A1 are covered by the first conductive member 11. The first conductive member 11 electrically connects the first ground pad PD1 and the protective electrode 113.

The second area A2 of the first substrate 111 of the display panel 100 and the predetermined area of the upper surface of the protective electrode 113 adjacent to the second area A2 are covered by the second conductive member 12. The second conductive member 12 electrically connects the second ground pad PD2 and the protective electrode 113. The structure of the other elements of the display panel 100 is the same as the described above.

Figure 6B:
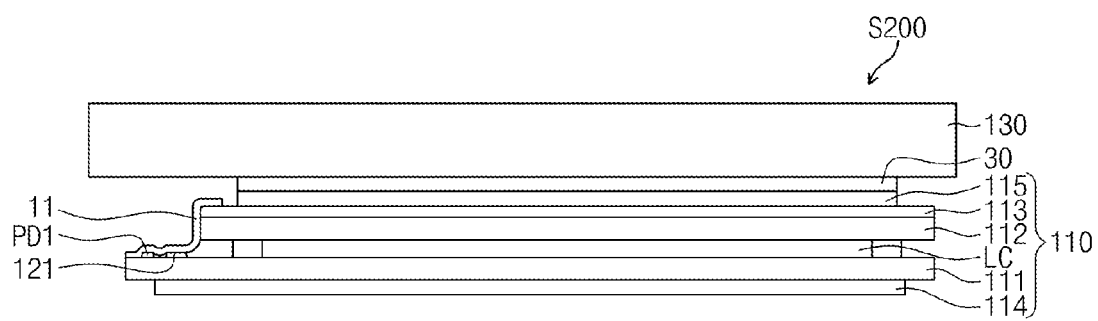

Referring to FIGS. 5 and 6B, the touch panel 130 is attached onto the display panel 110 (S200). In detail, the touch panel 130 is disposed on the display panel 110, and the display panel 110 and the touch panel 130 are attached to each other by the first adhesive member 30.

The protective electrode 113 is disposed on the upper surface of the second substrate 112 of the display panel 110. The upper polarizing plate 115 is disposed on the upper surface of the protective electrode 113. The first adhesive member 30 is disposed on the upper polarizing plate 115, and the touch panel 130 is attached to the display panel 110 by the first adhesive member 30.

Figure 6C:
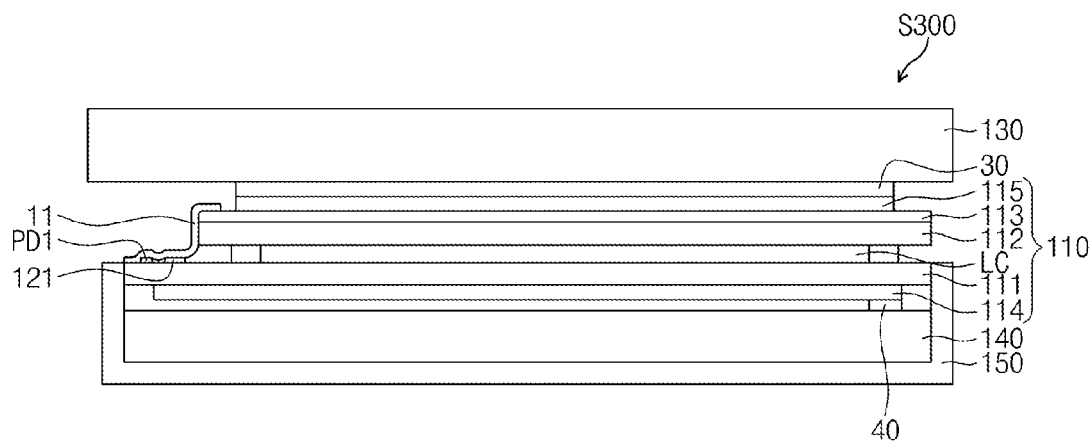

Referring to FIGS. 5 and 6C, the backlight unit 140 fitted in the bottom chassis 150 is attached to the lower portion of the display panel 110 (S300). In more detail, the backlight unit 140 is disposed under the display panel 110, and the display panel 110 and the backlight unit 140 are attached to each other by the second adhesive member 40.

The lower polarizing plate 114 is disposed on the lower surface of the first substrate 111 of the display panel 110. The second adhesive member 40 is disposed on the lower surface of the lower polarizing plate 114, and the backlight unit 140 is attached to the display panel 110 by the second adhesive member 40.

The first, second, and third double-sided tapes 41, 42, and 43 are disposed in the areas of the side portions of the lower surface of the display panel 110 that do not correspond to the the side portion of the display panel 110 in which the gate driver 121 is disposed. As described above, the first, second, and third double-sided tapes 41, 42, and 43 are disposed in the upper, lower, and right areas of the lower surface of the display panel 110. Therefore, the upper, lower, and right areas of the lower surface of the display panel 110 may be attached to the backlight unit 140 by the first, second, and third double-sided tapes 41, 42, and 43.

Figure 6D:
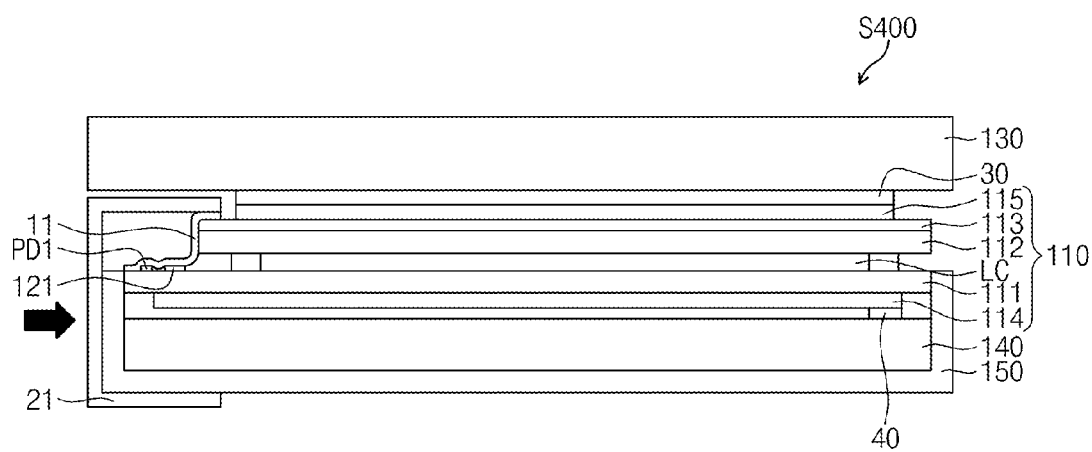

Referring to FIGS. 5 and 6D, the first and second fixing members 21 and 22 are attached to the display panel 110 and the bottom chassis 150, and are disposed at the side portion of the display panel 110 in which the first, second, and third double-sided tapes 41, 42, and 43 are not disposed. For instance, the first and second fixing members 21 and 22 are disposed in the left area of the display panel 110, in which the first, second, and third double-sided tapes 41, 42, and 43 are not disposed. The position at which the first and second fixing members 21 and 22 are clipped is at a the side portion of the display panel 110 where the gate driver 121 is disposed, and the side portion of the bottom chassis 150 corresponding to the side portion of the display panel 110 where the gate driver 121 is disposed.

The side portion of the display panel 110 of the display apparatus 100 and the side portion of the backlight unit 140 are fixed to each other by the first and second fixing members 21 and 22. The first, second, and third double-sided tapes 41, 42, and 43 are disposed in the upper, lower, and right areas of the display panel 110 in which the first and second fixing members 21 and 22 are not disposed. The display panel 110 and the backlight unit 140 are attached to each other by the first, second, and third double-sided tapes 41, 42, and 43. Thus, the fixing force of the display panel 110 and the backlight unit 140 is at least as strong as when double-sided tapes are disposed in the upper, lower, left, and right areas of the lower surface of the display panel 110.

In addition, if defects occur in the display apparatus 100, the first and second fixing members 21 and 22 are removed in order to rework the display apparatus 100. The double-sided tape is not disposed on the side portion of the display panel 110 where the first and second fixing members 21 and 22 are disposed. Therefore, when the first and second fixing members 21 and 22 are removed, a predetermined space is generated between the side portion of the display panel 110 and the side portion of the backlight unit 140 because the first and second fixing members 21 and 22 are used instead of the double-sided tapes. When the display panel 110 and the backlight unit 140 are separated from each other using the predetermined space, damage to the display panel 110 may be prevented as compared to when the double-sided tapes are disposed in the upper, lower, left, and right areas of the lower surface of the display panel 110. In addition, because the first and second conductive members 11 and 12 are not required to be removed, no additional conductive members are required even though the display apparatus 100 is reworked.

Consequently, the display apparatus 100 according to the present exemplary embodiment may be easily reworked.

Although exemplary embodiments have been described, it is understood that the present invention should not be limited to these exemplary embodiments but various changes and modifications can be made by one ordinary skilled in the art within the spirit and scope of the present disclosure including the following claims.

What is claimed is:

1. A display apparatus comprising:
 a display panel that includes a first substrate, a second substrate on the first substrate, a protective electrode on an upper surface of the second substrate opposite the first substrate, and a ground pad, the ground pad applied with a ground voltage;

a conductive member that electrically connects the ground pads and the protective electrode;

a backlight unit that provides light to the display panel;

a bottom chassis that accommodates the backlight unit; and at least one fixing member that fixes a side portion of the display panel and a side portion of the bottom chassis to each other, wherein the fixing member makes contact with the conductive member and the bottom chassis to electrically connect the conductive member and the bottom chassis, wherein the first substrate includes a first area which does not overlap with the second substrate, the around pad is disposed on an upper surface of the first area, and the conductive member covers a portion of the upper surface of the first area and the ground pad.

2. The display apparatus of claim 1, further comprising:
a touch panel disposed on the display panel; and
a first adhesive member that attaches the touch panel to the display panel.

3. The display apparatus of claim 1, wherein the display panel further comprises:
a plurality of pixels included on the first substrate;
a liquid crystal layer interposed between the first substrate and the second substrate;
a gate driver that applies gate signals to the pixels; and
a data driver that applies data voltages to the pixels, and the protective electrode is disposed on an upper surface of the second substrate.

4. The display apparatus of claim 3, wherein the first substrate comprises a second area, which is not overlapped with the second substrate and extended in directions perpendicular to the first area along a border area of the first substrate, and wherein the gate driver is disposed in the first area, and the data driver is connected to the second area.

5. The display apparatus of claim 4, wherein the ground pad further comprises:
a second ground pad disposed in the second area.

6. The display apparatus of claim 5, wherein the conductive member comprises:
a second conductive member that covers the second area and a predetermined area of the upper surface of the protective electrode adjacent to the second area to electrically connect the second ground pad and the protective electrode.

7. The display apparatus of claim 6, wherein the fixing member makes contact with an upper surface of the first conductive member that is in contact with the protective electrode, and a predetermined area of outer side and lower surfaces of the side portion of the bottom chassis, and the first conductive member and the second conductive member are overlapped with each other in an area in which the first conductive member crosses the second conductive member.

8. The display apparatus of claim 1, further comprising a plurality of second adhesive members disposed on areas of side portions of a lower surface of the display panel excluding the side portion of the lower surface of the display panel corresponding to a position where the fixing member is disposed, wherein the backlight unit is attached to the display panel by the second adhesive members.

9. The display apparatus of claim 1, wherein the fixing member has a flat U-shape.

10. The display apparatus of claim 1, wherein the conductive member comprises a conductive tape or a silver paste.

11. The display apparatus of claim 1, wherein the display panel is operated in an in-plane switching mode.

12. A method of manufacturing a display apparatus, comprising:
preparing a display panel that includes a protective electrode, ground pads applied with a ground voltage, and a plurality of conductive members electrically connecting the ground pads and the protective electrode;
disposing a touch panel on the display panel;
attaching the touch panel to the display panel;
disposing a bottom chassis, in which a backlight unit is fitted, under the display panel;
disposing a plurality of adhesive members on areas of side portions of a lower surface of the display panel excluding the side portion of the lower surface of the display panel corresponding to a position where the fixing member is disposed ;
attaching the display panel and the backlight unit to each other using the adhesive members; and
fixing the side portion of the display panel and a side portion of the bottom chassis to each other using at least one fixing member, wherein the fixing member makes contact with the conductive members and the bottom chassis to electrically connect the conductive members and the bottom chassis.

13. The method of claim 12, wherein the display panel further comprises:
a first substrate that includes a plurality of pixels;
a second substrate that faces the second substrate;
a liquid crystal layer interposed between the first substrate and the second substrate;
a gate driver that applies gate signals to the pixels; and
a data driver that applies data voltages to the pixels, and the protective electrode is disposed on an upper surface of the second substrate.

14. The method of claim 13, wherein the first substrate comprises a first area and a second area, which are not overlapped with the second substrate and which in directions perpendicular to each other along a border area of the first substrate, wherein the gate driver is disposed in the first area, the data driver is connected to the second area, and the ground pads comprise a first ground pad disposed in the first area and a second ground pad disposed in the second area.

15. The method of claim 14, wherein the conductive members comprise:
a first conductive member that covers the first area and a predetermined area of an upper surface of the protective electrode adjacent to the first area to electrically connect the first ground pad and the protective electrode; and
a second conductive member that covers the second area and a predetermined area of the upper surface of the protective electrode adjacent to the second area to electrically connect the second ground pad and the protective electrode.

16. The method of claim 15, wherein the fixing member makes contact with an upper surface of the first conductive member that is in contact with the protective electrode and a predetermined area of outer side and lower surfaces of the side portion of the bottom chassis, and the first conductive member and the second conductive member are overlapped with each other in an area in which the first conductive member crosses the second conductive member.

* * * * *